J. L. CREVELING.
ELECTRIC REGULATION.
APPLICATION FILED FEB. 26, 1912.
1,189,794.
Patented July 4, 1916.
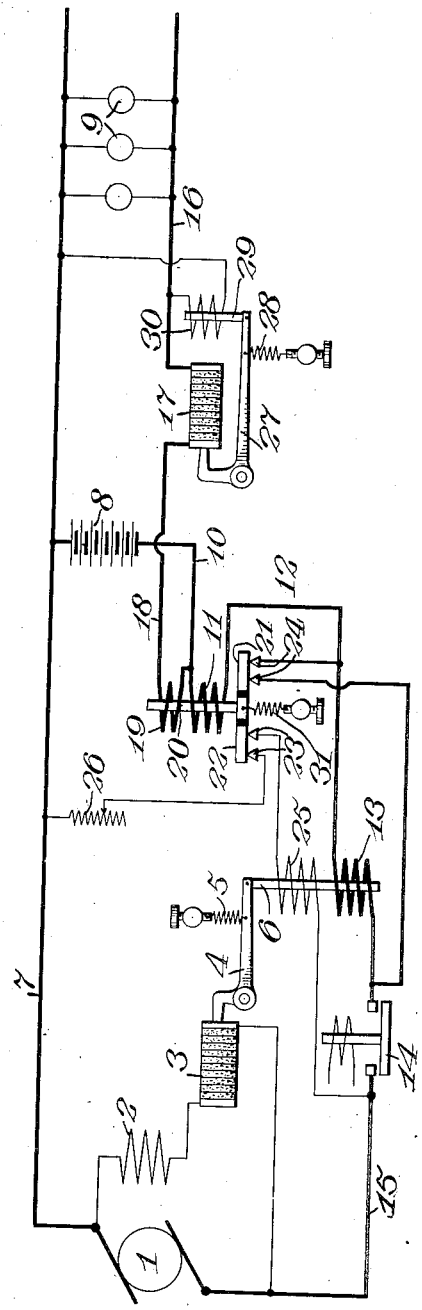
WITNESSES
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,189,794.           Specification of Letters Patent.           Patented July 4, 1916.

Application filed February 26, 1912. Serial No. 679,854.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate a dynamo or generator in a predetermined manner.

As my invention is particularly applicable to systems of electric distribution wherein it is desired to automatically regulate a generator throughout wide changes in speed and to properly charge a storage battery and supply lamps or other translating devices, it will be described with reference to such a system.

The drawing is a diagrammatic representation of one type of system embodying the essentials of my invention.

In the drawing 1 represents a dynamo provided with the usual field coil 2 having in series therewith a resistance 3 indicated as of the carbon pile variety.

4 is a lever normally drawn in an upward direction as by the adjustable spring 5 and carrying at one extremity a core of magnetic material 6.

The positive lead of the generator is connected with the positive side of the storage battery 8 and the positive terminals of the lamps or other translating devices indicated at 9. The negative side of the storage battery is connected as by the wire 10 with one side of the solenoid 11 having its opposite terminal connected with the wire 12 connecting with one side of the solenoid 13 which terminates in one of the contacts of the switch 14, the opposite contact of which is connected as by the wire 15 with the negative side of the generator. The negative terminals of the translating devices 9 are connected as by the wire 16 with the adjustable resistance, or regulating element 17, in this instance indicated as a carbon pile, having its opposite terminal connected as by the wire 18 with one end of the solenoid 19, the opposite terminal of which is connected with the wire 10. The solenoids 19 and 11 surround the core 20 and tend to lift the same against the action of the adjustable spring 31. The core 20 carries the contact members 21 and 22 insulated from each other and adapted to cause communication between contacts 24 and 23 respectively. The contacts 23 are in series with the coil 25 across the generator circuit through an adjustable resistance 26. The lever 27 normally drawn in a downward direction as by the spring 28, tends to compress the carbon pile 17 and lower the resistance thereof and the said lever is provided at its extremity with a core 29 surrounded by the solenoid 30 in shunt across the translation circuit.

An operation of my invention is substantially as follows: If the generator be at rest, the switch 14 will be open and the lamps or other translating devices will be supplied with current by the storage battery 8 through wire 7, translating devices 9, wire 16, regulating element 17, wire 18, coil 19 and wire 10 to the battery and, unless a very abnormal current be used in the translation circuit, the core 20 will not be lifted by current supplied by the battery through the coil 19, as the same is of a few turns for adjusting purposes as will hereinafter more plainly appear. If now, the generator be started and its voltage brought up to substantially equal that of the storage battery, the switch 14 will close, the same being of the automatic variety adapted to open and close the circuit when the generator and storage battery voltages are substantially equal and, as many switches of this character are well known in the art and the particular type of switch forms no part of my present invention, the presence of one of the well known types is merely indicated diagrammatically at 14. If now, the generator speed be raised until it is supplying the normal voltage, I so adjust the spring 5 and resistance 26 that the current flowing through the coil 25 will, upon any appreciable increase in voltage, draw the core 6 downwardly and increase the resistance 3 in such manner as to hold the generator voltage substantially constant throughout increases in speed. The current supplied by the generator to the battery will return through the wire 10, coil 11, wire 12 and the shunt controlled by the contacts 24 and 21, a small negligible part passing through the solenoid 13 which is short circuited, and thence through switch 14 and lead 15 to the generator. The current supplied to the translating devices 11 will return through wire 16, regulator 17, wire 18, solenoid 19, solenoid 11 and wire 12 and thence as above outlined, and the solenoids 19 and 11 are so wound as to oppose each other, the coil 11 being considerably stronger than the coil 19. If now this standard voltage, held upon the generator by the coil 25, tend for any reason to cause too great a current to be delivered by the generator through the solenoid 11, the said solenoid will lift the core 20 against the action of the spring 31 and break the contacts 22—23 and thus cut out the coil 25. The lifting of the core 20 will simultaneously break the contact at 21—24 and open the short circuit around the coil 13 which will then carry the entire generator output, and the said coil is so wound that a desired maximum output will not be exceeded by the generator throughout speed changes regardless of how low a voltage will be necessary to produce this output. The current flowing through the translation circuit is held substantially constant at the desired voltage by the solenoid 30 tending to increase the resistance 17 against the spring 28 which is adjusted to hold the proper voltage across the line and the current consumed in the translation circuit, by passing through the coil 19 and opposing the action of the coil 11, will cause a greater current output from the generator to be necessary to lift the core 20 and change the generator regulator from a voltage regulator to a current regulator when current is being consumed in the lamp circuit.

It will be obvious that I have produced a system wherein a dynamo or generator driven at variable speeds will be automatically governed to charge a storage battery upon a constant potential circuit and supply lamps or other translating devices at a substantially constant voltage and in case said constant potential across the battery tend to deliver to the same too great a charging current, the regulation of the generator will be shifted from voltage regulation to constant current regulation and it will be noted that the current output of the generator necessary to cause the shifting from voltage regulated to current regulated will be modified in accordance with the operation of the regulator controlling said lamp circuit.

I do not wish in any way to limit myself to the exact details or mode of operation set forth in this specification, for it will be obvious that wide departure may be made in the way of details without departing from the spirit and scope of my invention which is as set forth in the following claims:

1. The combination with a dynamo and a regulating element for controlling the same, of means for controlling said regulating element responsive to voltage fluctuations, means for controlling said element responsive to current fluctuations, automatic means for determining which of said operating means shall govern said regulating element and means for modifying said automatic means in response to current fluctuations.

2. The combination with a dynamo and a regulating element for controlling the same, of means for controlling said regulating element responsive to voltage fluctuations, means for controlling said elements responsive to current fluctuations, automatic means for determining which of said operating means shall govern said regulating element and means for modifying said automatic means in response to current fluctuations in a circuit supplied by said generator.

3. The combination with a generator, a supply circuit, a storage battery and a work circuit, of means the operation of which controls said generator, operating means for affecting the same responsive to voltage fluctuations, operating means for affecting the same responsive to current fluctuations and automatic means for determining which of said operating means shall dominate in controlling the generator dependent upon current fluctuations and means for adjusting the operation of said automatic means in response to current fluctuations in the work circuit.

4. The combination with a generator, a supply circuit, a storage battery and a translation circuit, means for regulating the generator, operating means for said regulating means affected by voltage fluctuations, operating means for said regulating means affected by current fluctuations and automatic means for controlling the operativeness of said operating means in response to current fluctuations and means for affecting said automatic means in response to variations in the translation circuit.

5. The combination with a generator, a supply circuit, and a work circuit, of means for regulating the generator in response to voltage fluctuations and in response to current fluctuations comprehending a voltage coil and a current coil and automatic means for determining which of said coils shall operate the regulating means responsive to current fluctuations in the supply circuit and means for modifying the point of action of said automatic means in accordance with conditions in the work circuit.

6. The combination with a generator, automatic regulating means for the same and means for adjusting the operation of said regulating means, of means in series with said adjusting means for modifying said adjusting means in accordance with the useful load upon said generator.

7. The combination with a generator, a supply circuit and a lamp circuit, of means for automatically regulating the generator responsive to characteristics of the supply circuit and automatic means for adjusting said means in response to current fluctuations and means in series with said adjusting means for modifying the adjustment of said last named means in response to fluctuations in the lamp circuit.

8. The combination with a generator, a supply circuit and a work circuit, of means for automatically regulating the generator responsive to characteristics of the supply circuit, automatic means for adjusting said means in response to current fluctuations and means in series with said adjusting means for modifying the adjustment of said last named means in accordance with the condition of the work circuit.

9. The combination with a generator, a supply circuit and a work circuit, of means for automatically regulating the generator responsive to characteristics of the supply circuit, automatic means for adjusting said regulating means in response to current fluctuations, and means in series with said automatic means for effecting the adjustment of said automatic means in accordance with current changes in the work circuit.

10. The combination with a dynamo and a regulating element for controlling the same, of means for controlling said regulating element responsive to voltage fluctuations, means for controlling said element responsive to current fluctuations, automatic means for determining which of said operating means shall govern said regulating element, and electrical means for modifying said automatic means.

11. The combination with a generator, automatic regulating means for the same, means for changing the operation of said regulating means, means for determining when the operation of said regulating means shall be changed, and electrical means for modifying the action of said last-named means.

JOHN L. CREVELING.

Witnesses:
ANNA M. WALL,
M. HERSKOORTZ.